United States Patent
Ruch et al.

(10) Patent No.: US 8,013,045 B2
(45) Date of Patent: Sep. 6, 2011

(54) MONOAZO COLORANTS FOR MASS-COLOURING OF POLYMERS

(75) Inventors: Thomas Ruch, Delémont (CH); Ursula Luterbacher, Reinach (CH)

(73) Assignee: BASF SE Ludwigshafen (DE)

( * ) Notice: Subject to any disclaimer, the term of this patent is extended or adjusted under 35 U.S.C. 154(b) by 44 days.

(21) Appl. No.: 12/490,423

(22) Filed: Jun. 24, 2009

(65) Prior Publication Data
US 2010/0168291 A1    Jul. 1, 2010

Related U.S. Application Data

(63) Continuation-in-part of application No. 12/446,252, filed on Apr. 20, 2009, now abandoned.

(51) Int. Cl.
C08K 5/3492   (2006.01)
C07D 239/02   (2006.01)
C07D 239/22   (2006.01)
C09B 67/00    (2006.01)

(52) U.S. Cl. .............. 524/100; 106/287.21; 544/327

(58) Field of Classification Search .......... 524/100; 106/287.21; 544/327
See application file for complete search history.

(56) References Cited

U.S. PATENT DOCUMENTS

| | | | |
|---|---|---|---|
| 3,527,748 A | 9/1970 | Ackermann et al. |
| 3,598,801 A | 8/1971 | Beffa et al. |
| 4,014,863 A | 3/1977 | Stephan et al. |
| 4,340,430 A | 7/1982 | Roueche |
| 4,370,431 A | 1/1983 | Lienhard et al. |
| 5,395,926 A | 3/1995 | Hari et al. |
| 5,510,483 A | 4/1996 | Barra et al. |

FOREIGN PATENT DOCUMENTS

| | | |
|---|---|---|
| DE | 1445982 | 3/1969 |
| DE | 1769250 | 7/1971 |
| DE | 2351294 | 4/1975 |
| DE | 2428199 | 1/1976 |
| DE | 4407802 | 9/1994 |
| EP | 0046729 | 3/1982 |
| EP | 0591105 | 4/1994 |
| FR | 1527728 | 6/1968 |
| GB | 727045 | 3/1955 |
| GB | 1060797 | 3/1967 |
| GB | 1223489 | 2/1971 |
| PL | 162231 | 9/1993 |

OTHER PUBLICATIONS

Abstract No. 1960:44776 of JP34000875.
English Language abstract of PL 162231 from the esp@cenet web site printed on Jun. 12, 2009.
Patent Abstracts of Japan Pub. No. 2004-059687, Feb. 2004.
Journal of American Chemical Society, vol. 76, No. 8 pp. 2263-2265 (1954).
Chemical Abstract No. 1976:107063 of DE 2428199.
Copending U.S. Appl. No. 12/446,252.

Primary Examiner — Kriellion A Sanders
(74) Attorney, Agent, or Firm — Tyler A. Stevenson

(57) ABSTRACT

A process for mass-coloring high molecular weight material, in which process a compound of formula

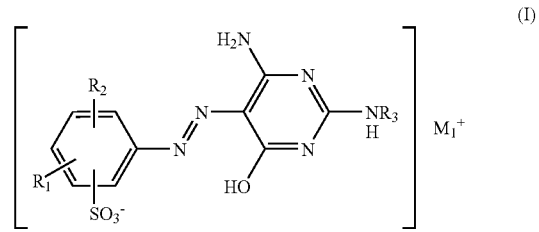

(I)

or a tautomer thereof,
wherein
$M_1$ is H, ½ $M_2$, ⅓ $M_3$ or $NR_4R_5R_6R_7$, preferably H, ½ $M_2$ or $NR_4R_5R_6R_7$, especially H,
$M_2$ is an alkaline earth or transition metal in oxidation state II or an oxo-metal in oxidation state IV,
$M_3$ is Al(III), a transition metal in oxidation state III or an oxo-metal in oxidation state V,
$R_1$ is H or a non-ionic substituent,
$R_2$ is H or, independently of $R_1$, a further non-ionic substituent,
$R_3$ is H, $C_1$-$C_6$alkyl, phenyl, CO—$C_1$-$C_6$alkyl or CO-phenyl, preferably H or CO—$C_1$-$C_6$alkyl, especially H, and
$R_4$, $R_5$, $R_6$ and $R_7$ are each independently of the others H or phenyl, benzyl or $C_1$-$C_6$alkyl, which are unsubstituted or may be substituted by hydroxy or by halogen and in the case of $C_3$-$C_6$alkyl is uninterrupted or interrupted by O,
is incorporated into the high molecular weight material before or during shaping.
The colorations obtained have good light stability and thermal stability, especially in polyolefins.

20 Claims, No Drawings

MONOAZO COLORANTS FOR MASS-COLOURING OF POLYMERS

This application is a continuation-in-part of U.S. application Ser. No. 12/446,252 filed Apr. 20, 2009, abandoned, filed as Application No. PCT/EP07/60925 on Oct. 15, 2007, which application is hereby incorporated by reference.

Colour Index Pigment Yellow 191:2 is a pigment which has excellent coloristics but which has to be prepared from basic chemicals in a number of steps. There is therefore a need for a pigment having similarly good coloristics that is simple to prepare and exhibits good application-related properties in the mass-colouring of polymers.

JP S34/000 875 discloses compounds which can be used as antagonists for the metabolism of nucleic acids and medicaments against cancer (or as starting materials therefor), including the compound of formula

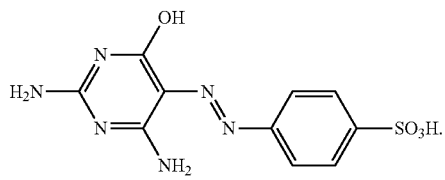

DE-OS 1 445 982 discloses a process for the preparation of 4-amino-5-arylazo-pyrimidine derivatives, in Example 8 having the formula

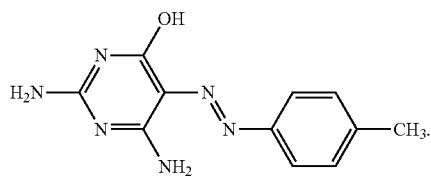

DE-OS 1 769 250 discloses a process for the preparation of water-soluble azopyrimidine dyes of the general formula

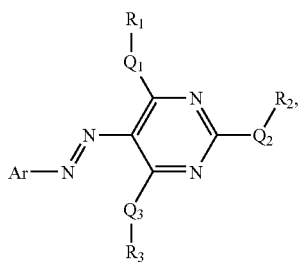

and in Example 104 a dye of formula

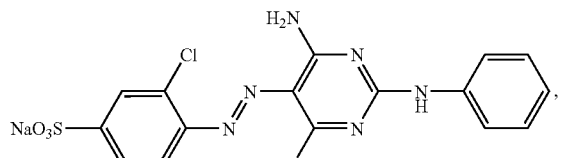

which dyes wool and polyamide fibres in fast pure yellow shades.

DE-OS 23 51 294 discloses azo pigments of the preferred general formula

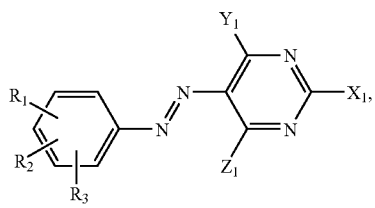

wherein $X_1$ may be inter alia amino and $Y_1$ and $Z_1$ are OH or $NH_2$, but $X_1$, $Y_1$ and $Z_1$ are not all simultaneously OH. The definitions of $R_1$, $R_2$ and $R_3$ include neither $SO_3H$ groups nor their salts.

U.S. Pat. No. 4,340,430 discloses triaminopyrimidine azo pigments, and in Examples 21/22 those of formula

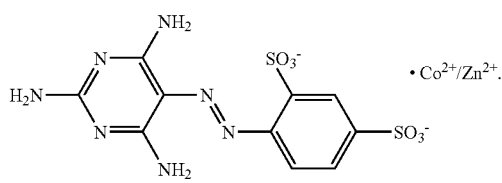

PL 162 231 B2 discloses azo dyes for dyeing wool or polyamide, and in Example 2 that of formula

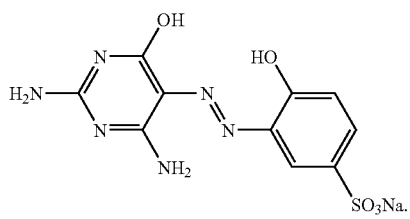

DE-OS 2 428 199 discloses pigments of the formula

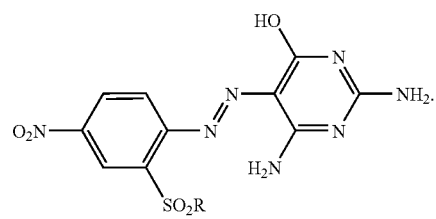

EP 0 591 105 A2 discloses bisazo compounds which are prepared in a two-step process in overall unsatisfactory yields, and in Example 41 the compound of formula

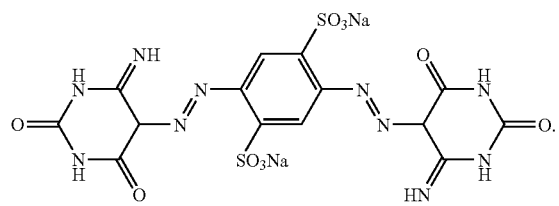

DE-OS 44 07 802 discloses azo compounds and intermediates of the general formula

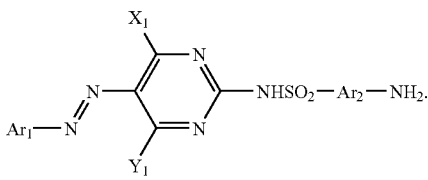

It has now been found, surprisingly, that good colorants for mass-colouring polymers can be prepared in a very simple way. The invention accordingly relates to a process for mass-colouring high molecular weight material, in which process a compound of formula

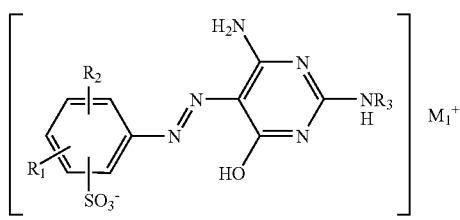

or a tautomer thereof,
wherein
$M_1$ is H, ½ $M_2$, ⅓ $M_3$ or $NR_4R_5R_6R_7$, preferably H, ½ $M_2$ or $NR_4R_5R_6R_7$, especially H,
$M_2$ is an alkaline earth or transition metal in oxidation state II or an oxo-metal in oxidation state IV,
$M_3$ is Al(III), a transition metal in oxidation state III or an oxo-metal in oxidation state V,
$R_1$ is H or a non-ionic substituent,
$R_2$ is H or, independently of $R_1$, a further non-ionic substituent,
$R_3$ is H, $C_1$-$C_6$alkyl, phenyl, CO—$C_1$-$C_6$alkyl or CO-phenyl, preferably H or CO—$C_1$-$C_6$alkyl, especially H, and
$R_4$, $R_5$, $R_6$ and $R_7$ are each independently of the others H or phenyl, benzyl or $C_1$-$C_6$alkyl, which are unsubstituted or may be substituted by hydroxy or by halogen and in the case of $C_3$-$C_6$alkyl is uninterrupted or interrupted by 0,
is incorporated into the high molecular weight material before or during shaping.
$M_2$ is preferably Ca, Co, Cu, Fe, Mg, Mn, Sr, TiO, Zn or ZrO.
$M_3$ is preferably Al, Ce, Co, Cr, Fe or VO. The fractions ½ and ⅓ mean that a metal atom $M_2$ or $M_3$ forms a salt with two or with three sulfonate molecules, respectively.
$R_1$ is preferably a non-ionic substituent having a para Hammett constant $\sigma_p$ of from −0.3 to 0.6, especially from −0.3 to 0.3. $R_2$ is preferably H or, independently of $R_1$, a further non-ionic substituent having a para Hammett constant $\sigma_p$ of from −0.3 to 0.6, especially from −0.3 to 0.3, but $R_2$ is very especially H.
Non-ionic substituents are such which, attached to a phenyl group, form a compound having a dissociation constant $\geq 1 \cdot 10^{-10}$ in water at 20° C. Non-ionic substituents having a para Hammett constant $\sigma_p$ of from −0.3 to 0.6 are, for example, $OCH_3$ ($\sigma_p$=−0.27), tert-$C_4H_9$ ($\sigma_p$=−0.20), $CH_3$ ($\sigma_p$=−0.17), $NHCOCH_3$ ($\sigma_p$=−0.01), $C_6H_5$ ($\sigma_p$=−0.01), F ($\sigma_p$=0.06), I ($\sigma_p$=0.18), Cl ($\sigma_p$=0.22), Br ($\sigma_p$=0.23), $CO_2C_2H_5$ ($\sigma_p$=0.45) and $CF_3$ ($\sigma_p$=0.54).

The Hammett constants of common substituents can be found in tabular form in, for example, Römmpp's encyclopaedia (www.roempp.com). The Hammett constants of further substituents can be determined in accordance with Chem. Rev. 17, 125-136 [1935]. Ionic substituents, such as $COO^-$ or $SO_3^-$, and strongly polarising substituents, such as $N(CH_3)_3$ ($\sigma_p$=−0.83), $NH_2$ ($\sigma_p$=−0.66), OH ($\sigma_p$=−0.37), CN ($\sigma_p$=0.66) or $NO_2$ ($\sigma_p$=0.78), however, often result undesirably in less advantageous properties.

The compounds of formula (I) can also be in the form of mixtures or solid solutions with other salts (for example with alkali metal salts). Depending upon the reaction and drying parameters it is also possible for water of crystallisation to be present.

$C_1$-$C_6$Alkyl is, for example, methyl, ethyl, n-propyl, isopropyl, n-butyl, sec-butyl, isobutyl, tert-butyl, n-pentyl, 2-pentyl, 3-pentyl, 2,2-dimethylpropyl or n-hexyl.

Halogen is chlorine, bromine, fluorine or iodine, preferably fluorine or chlorine, especially fluorine on alkyl (for example trifluoromethyl, α,α,α-trifluoroethyl or perfluorinated alkyl groups such as heptafluoropropyl) and chlorine on phenyl.

It is especially preferred for $R_1$ to be $C_1$-$C_6$alkyl, $OC_1$-$C_6$alkyl, $NHCOC_1$-$C_6$alkyl, phenyl or Cl, more especially $C_1$-$C_4$alkyl, for example tert-butyl or very especially methyl, and for $R_2$ and $R_3$ to be hydrogen. The sulfo group $SO_3M$ is preferably in the position ortho to the azo bridge.

Especially, many of the particularly interesting compounds are novel. The invention accordingly relates also to a compound of formula

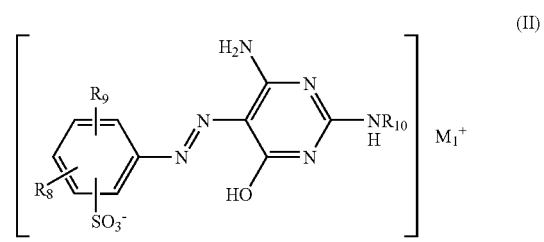

or a tautomer thereof, wherein
$M_1$ is H, ½ $M_2$, ⅓ $M_3$ or $NR_4R_5R_6R_7$, preferably ½ $M_2$ or $NR_4R_5R_6R_7$, especially H,
$M_2$ is an alkaline earth or transition metal in oxidation state II or an oxo-metal in oxidation state IV,
$M_3$ is Al(III), a transition metal in oxidation state III or an oxo-metal in oxidation state V,
$R_8$ is a non-ionic substituent, different from hydrogen, having a para Hammett constant $\sigma_p$ of from −0.3 to 0.6, preferably from −0.3 to 0.3,
$R_9$ is H or, independently of $R_8$, a further non-ionic substituent having a para Hammett constant $\sigma_p$ of from −0.3 to 0.6, preferably from −0.3 to 0.3,
$R_{10}$ is H, $C_1$-$C_6$alkyl, phenyl, CO—$C_1$-$C_6$alkyl or CO-phenyl, preferably H or CO—$C_1$-$C_6$alkyl, especially H, and
$R_4$, $R_5$, $R_6$ and $R_7$ are each independently of the others H or phenyl, benzyl or $C_1$-$C_6$alkyl, which are unsubstituted or may be substituted by hydroxy or by halogen and in the case of $C_3$-$C_6$alkyl is uninterrupted or interrupted by O.

Also novel is a compound of formula

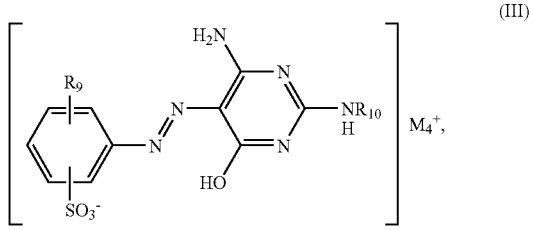
(III)

or a tautomer thereof, wherein
$M_4$ is ½ $M_2$, ⅓ $M_3$ or $NR_4R_5R_6R_7$,
$M_2$ is an alkaline earth or transition metal in oxidation state II or an oxo-metal in oxidation state IV,
$M_3$ is Al(III), a transition metal in oxidation state III or an oxo-metal in oxidation state V,
$R_9$ is H or, independently of $R_8$, a further non-ionic substituent having a para Hammett constant $\sigma_p$ of from −0.3 to 0.6, preferably from −0.3 to 0.3,
$R_{10}$ is H, $C_1$-$C_6$alkyl, phenyl, CO—$C_1$-$C_6$alkyl or CO-phenyl, preferably H or CO—$C_1$-$C_6$alkyl, especially H, and
$R_4$, $R_5$, $R_6$ and $R_7$ are each independently of the others H or phenyl, benzyl or $C_1$-$C_6$alkyl, which are unsubstituted or may be substituted by hydroxy or by halogen and in the case of $C_3$-$C_6$alkyl is uninterrupted or interrupted by O.

Preference is given to the compounds of formulae

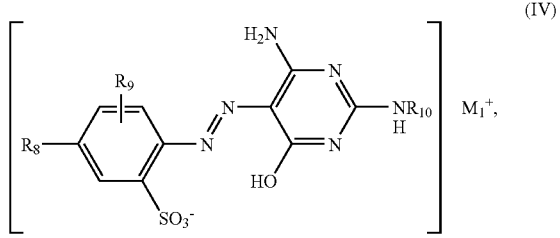
(IV)

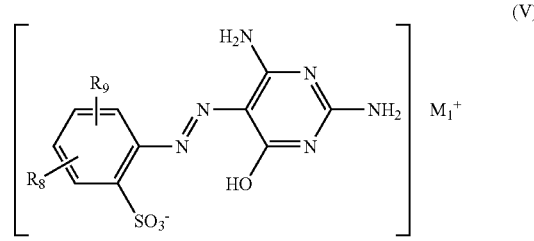
(V)

and especially

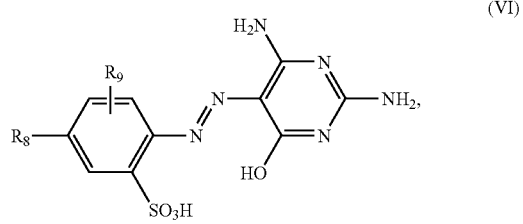
(VI)

which can also be present as tautomers, for example as sulfobetaines (when $M_1^+$ is H).

In general, sulfobetaines are advantageously distinguished by particularly high tinctorial strength and a slightly more reddish to orange colour shade with good fastness properties.

In formulae (II), (III), (IV), (V) and (VI), the same other preferences apply to $R_8$, $R_9$ and $R_{10}$ as to $R_1$, $R_2$ and $R_3$, respectively, in formula (I).

Special preference is given to compounds of formula

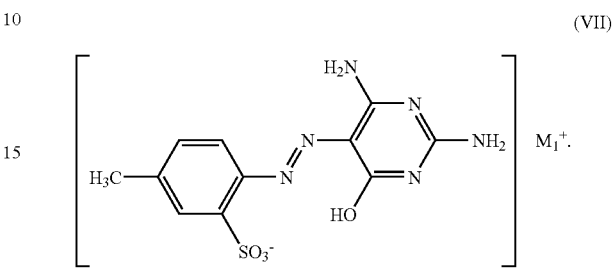
(VII)

The compounds of formulae (I), (II), (III), (IV), (V), (VI) and (VII) yield surprisingly high-temperature-stable, light-fast and tinctorially strong colorations when used for the mass-colouring of high molecular weight materials, especially plastics and plastics fibres.

The colorants according to the invention can be prepared in accordance with processes known per se or analogously thereto and isolated in pure form and dried, whereafter they are readily dispersible in plastics, surface coatings and printing inks, for example using a ball mill or bead mill. They can also be used in the form of wet presscakes directly for the production of pigment dispersions. To improve the application-related properties, customary additives can optionally be added in customary concentrations to the colorants according to the invention before or during precipitation or isolation.

The invention accordingly relates also to a mass-coloured high molecular weight material comprising from 0.01 to 70% by weight, based on the total coloured high molecular weight material, of a compound of formula (I), (II), (III), (IV), (V), (VI) or (VII) which is present in the form of solid particles distributed in the high molecular weight material or which, in dissolved form, homogeneously penetrates the high molecular weight material.

The invention relates also to the use of a compound of formula (I), (II), (III), (IV), (V), (VI) or (VII) in the mass-colouring of a high molecular weight material.

The high molecular weight material is preferably a polyolefin, such as high, medium or low density polyethylene (HDPE, HDPE-HMW, HDPE-UHMW, LDPE, LLDPE, VLDPE, ULDPE), polypropylene or polyisobutylene, an astonishing degree of high-temperature stability being achieved, which is also of interest even for applications in polyamide.

Although the colorants according to the invention are especially suitable for the mass-colouring of polyolefins, more especially polyethylene, they can also be used advantageously for the mass-colouring of other polymers.

The high molecular weight organic material to be coloured in accordance with the invention can be of natural or synthetic origin and usually has a molecular weight in the range of from $10^3$ to $10^8$ g/mol. It may be, for example, a natural resin or a drying oil, rubber or casein, or a modified natural substance, such as chlorinated rubber, an oil-modified alkyd resin, viscose, or a cellulose ether or ester, such as cellulose acetate, cellulose propionate, cellulose acetobutyrate or nitrocellulose, but is especially a completely synthetic organic polymer (either thermosetting plastics or thermoplastics), as are obtained by polymerisation, polycondensation or polyaddition, for example polycarbonate, polyester, such as polyethylene terephthalate or polybutylene terephthalate, polyolefins, such as polyethylene, polypropylene or polyisobutylene, substituted polyolefins, such as polymerisation products of vinyl chloride, vinyl acetate, styrene, acrylonitrile or acrylic acid and/or methacrylic acid esters, or butadiene, polystyrene or polymethyl methacrylate, and also copolymerisation products of the said monomers, especially acrylonitrile/butadiene/styrene (ABS), styrene/acrylonitrile (SAN) or EVA.

From the range of polyaddition resins and polycondensation resins there may be mentioned condensation products of formaldehyde with phenols, so-called phenoplasts, and condensation products of formaldehyde with urea, thiourea and melamine, so-called aminoplasts, the polyesters used as surface-coating resins, either saturated, such as alkyd resins, or unsaturated, such as maleic resins, also linear polyesters and polyamides or silicones.

Furthermore, the high molecular weight organic material can be a binder for surface coatings or printing inks, such as boiled linseed oil, nitrocellulose, alkyd resins, melamine resins, urea-formaldehyde resins, acrylic resins or other hardenable or polymerisable precursors.

The said high molecular weight compounds can be used alone or in mixtures, in the form of plastic compositions, solutions or melts, which can optionally be spun to form fibres. It may be a ready-to-use composition or an article formed therefrom, or a masterbatch, for example in the form of granules. Optionally, it is also possible to use for colouring high molecular weight organic materials in accordance with the invention customary additives, which may be contained both in the uncoloured organic material and in the colorant or can be added during incorporation.

Examples of such additives are stabilisers, such as antioxidants, UV stabilisers or light stabilisers, surfactants, wetting agents, plasticisers or texture improvers. When texture improvers are desired, they are optionally added preferably to the colorants according to the invention as early as during synthesis or during after-treatment.

Texture improvers are, for example, fatty acids having at least 12 carbon atoms, such as, especially, stearic or behenic acid, stearic or behenic acid amide, salts of stearic or behenic acid, such as magnesium, zinc or aluminium stearate or behenate, also quaternary ammonium compounds, such as, especially, tri($C_1$-$C_4$)alkylbenzylammonium salts, such as trimethyl-, triethyl-, tri-n-propyl-, tri-isopropyl-, tri-n-butyl-, tri-sec-butyl- and tri-tert-butyl-benzylammonium salts, and also plasticisers, such as epoxidised soybean oil, waxes, such as polyethylene wax, resin acids, such as abietic acid, colophonium soap, hydrogenated or dimerised colophonium, ($C_{12}$-$C_{18}$)paraffindisulfonic acid, alkylphenols and alcohols, such as stearyl alcohol, also lauryl amine or stearyl amine, and/or aliphatic 1,2-diols, such as 1,2-dodecanediol.

Preferred texture improvers are lauryl amine and stearyl amine, aliphatic 1,2-diols, stearic acid and its amides, salts and esters, epoxidised soybean oil, waxes and resin acids.

Such additives can be added, for example, advantageously in amounts of from 0.05 to 25% by weight, preferably from 0.5 to 15% by weight, based on the composition according to the invention, before, during or after the preparation thereof.

The pigmenting of the high molecular weight organic substances with the colorants according to the invention is carried out, for example, by admixing such a colorant, optionally in the form of a masterbatch, with the substrates using roll mills or mixing or grinding apparatus. The coloured material is then generally brought into the desired final form by methods known per se, such as by calendering, compression moulding, extrusion, coating, spraying, casting, printing or by injection moulding. It is often desirable, in order to produce non-rigid mouldings or to reduce their brittleness, to incorporate so-called plasticisers into the high molecular weight compounds prior to shaping. As plasticisers there may be used, for example, esters of phosphoric acid, phthalic acid or sebacic acid. In the process according to the invention, the plasticisers may be incorporated into the polymers before or after incorporation of the pigment dye. It is also possible, in order to achieve different colour shades, to add to the high molecular weight organic materials, in addition to the pigment compositions, also fillers or other colour-imparting constituents, such as white, coloured or black pigments as well as effect pigments, in the respective desired amount.

The admixing of the colorant can also be effected immediately prior to the actual processing step, for example by continuously feeding a pulverulent colorant according to the invention and, at the same time, a granulated high molecular weight organic material, and optionally also additional ingredients, such as, for example, additives, directly into the intake zone of an extruder, where mixing takes place immediately before processing. Generally, however, it is preferable to mix the colorant into the high molecular weight organic material beforehand, since more uniform results can be achieved.

For colouring surface coatings and printing inks, the high molecular weight organic materials and the colorants according to the invention are finely dispersed or dissolved, optionally together with additives, such as stabilisers, dispersants, gloss improvers, fillers, other pigments, siccatives or plasticisers, generally in an organic and/or aqueous solvent or solvent mixture. It is possible to use a procedure in which the individual components are dispersed or dissolved separately or in which a plurality thereof are dispersed or dissolved together and only then all of the components combined.

Surface coatings are applied, for example, by dipping, knife application, film drawing, brush application or spraying, the coatings according to the invention being formed after drying and hardening, advantageously thermally or by irradiation. Further methods of application that result in coatings are powder coating and coil coating methods, all the details of which are known per se to the person skilled in the art.

When the high molecular weight material to be coloured is a surface coating, it may be a customary coating or a speciality coating, for example an automotive finish.

Printing inks of generally known compositions are applied by customary methods, for example by letterpress printing (flexographic printing), planographic printing (offset printing, lithographic printing), intaglio printing (rotogravure, steel engraving), screen printing or ink-jet printing (piezo or vapour bubble methods), for example to paper, cardboard, metal, wood, leather, plastics or textiles, for publications, illustrations, packaging, banknotes, logistics documents or decoration. Further ink compositions can be used in ballpoint pens and felt-tip pens as well as in ink pads, ink ribbons and ink cartridges.

It is advisable for the person skilled in the art routinely to try out any plastics, surface-coating or printing ink compositions known to him, for example those which are the subject of published patent applications or those which are commercially available, even when he does not have precise knowledge of their compositions.

In addition to the mass-colouring of high molecular weight organic materials in the form of plastics, surface coatings and printing inks, the colorants according to the invention are also suitable, for example, for the production of solid toners, wax transfer ribbons or colour filters.

The following Examples illustrate the invention but do not limit the scope thereof (unless otherwise indicated, "%" always denotes % by weight):

EXAMPLE 1

7.56 g of 4-methylaniline-2-sulfonic acid (99%) are stirred in 160 ml of water and dissolved with 4 ml of 30% sodium hydroxide solution. 14 ml of 37% hydrochloric acid (technical grade) are then added. The mixture is cooled to 0-5° C. and 10 ml of aqueous 4N sodium nitrite solution are added dropwise. After 2 hours, 4 ml of aqueous 1N sulfamic acid solution are added to the diazonium suspension.

5.55 g of 2,4-diamino-6-hydroxypyrimidine are dissolved in 120 ml of water containing 30% sodium hydroxide solution, then added dropwise to the cold diazonium salt suspension within a period of 30 minutes. The pH is adjusted to pH 5.5 with 30% sodium hydroxide solution. The reaction mixture is stirred for a further 18 hours at 23° C. The suspension is then divided into two samples each of about 300 ml.

1) One portion of the suspension is heated to 60° C. and stirred for a further 1 hour. The yellow suspension is then filtered through a hard filter, washed with 250 ml of water and dried at 90° C./5·10³ Pa, yielding 6.2 g of a product of formula

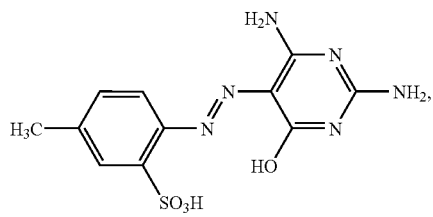

which, when used for mass-colouring PVC (calender) and HDPE (injection-moulding), yields a thermostable yellow coloration.

| Analysis: | C | H | N | S | Na |
|---|---|---|---|---|---|
| [%] | 40.0 | 3.9 | 26.1 | 9.5 | <1 ppm |
| calc.: | 40.7 | 3.7 | 25.9 | 9.9 | — |

2) The second portion of the suspension is treated with 1 g of sorbitan monolaurate in 10 ml of water. The mixture is heated to 60° C. and stirred for a further 1 hour.

The yellow suspension is then filtered through a hard filter and the residue is washed with 250 ml of water and dried in a vacuum cabinet at 90° C./5·10³ Pa, yielding 7.4 g of a product which, when used for mass-colouring PVC (calender) and HDPE (injection-moulding), yields thermostable yellow colorations.

| Analysis: | C | H | N | S | Na |
|---|---|---|---|---|---|
| [%] | 43.3 | 4.5 | 23.3 | 8.4 | <1 ppm |

EXAMPLE 2

22.7 g of 4-methylaniline-2-sulfonic acid (99%) are stirred in 450 ml of water. 30 ml of 37% hydrochloric acid (technical grade) are then added. The mixture is cooled to 0-5° C. and 40 ml of aqueous 4N sodium nitrite solution are added dropwise. After 1.5 hours, 6 ml of aqueous 1N sulfamic acid solution are added to the diazonium salt suspension.

16.6 g of 2,4-diamino-6-hydroxypyrimidine are dissolved in 360 ml of water containing 30% sodium hydroxide solution, then precipitated with acetic acid and cooled to 0-5° C. The cold diazonium salt suspension is then added dropwise thereto within a period of 30 minutes, while the pH is maintained at 5.5 by means of 30% sodium hydroxide solution. The orange suspension is stirred at 23° C. for a further 18 hours, then heated to 85° C. and stirred for 2 hours, finally filtered through a hard filter, washed with 1200 ml of water and dried at 90° C./5·10³ Pa, yielding 37.7 g (96.3% of theory) of a product which, when used for mass-colouring PVC (calender) and HDPE (injection-moulding), yields thermostable yellow colorations.

| Analysis: | C | H | N | S | Na |
|---|---|---|---|---|---|
| [%] | 40.4 | 3.9 | 26.2 | 9.6 | <1 ppm |
| calc.: | 40.7 | 3.7 | 25.9 | 9.9 | — |

By varying the pH value it is also possible to obtain pigment mixtures or solid solutions which in part comprise alkali metal ions as $M_1^+$ (e.g. $Na^+$, $Li^+$, $K^+$).

EXAMPLES 3-5

The procedure is carried out analogously to Example 2, but the sulfonic acid is neutralised with calcium, strontium or ammonium acetate when coupling is complete, yielding compounds having the following structures which, when used for mass-colouring PVC (calender) and HDPE (injection-moulding), yield thermostable yellow colorations:

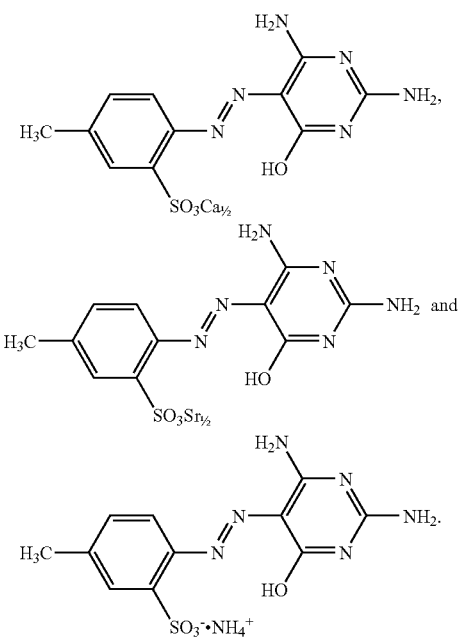

EXAMPLE 6

0.2% by weight of the product according to Example 1 or 2 is incorporated into polyamide 6 (Ultramid® B3K, BASF)

in an extruder, after which test plates (for example 30×50×2 mm) are produced by injection-moulding at 240° C. Homogeneous colorations having good light stability are obtained.

EXAMPLES 7-10

The procedure is carried out analogously to Examples 2-5, but instead of 4-methylaniline-2-sulfonic acid there is used an equivalent amount of 2-methylaniline-4-sulfonic acid. The results are very similar to those of Examples 2-5.

EXAMPLES 11-14

The procedure is carried out analogously to Examples 2-5, but instead of 4-methylaniline-2-sulfonic acid there is used an equivalent amount of aniline-4-sulfonic acid. The results are very similar to those of Examples 2-5, but with a slightly more green-tinged colour shade.

EXAMPLES 15-16

The procedure is carried out analogously to Examples 2-3, but instead of 4-methylaniline-2-sulfonic acid there is used an equivalent amount of aniline-3-sulfonic acid, there additionally being added 20% by weight (based on the amount of pigment theoretically obtainable) of a colophonium resin to improve the texture.

EXAMPLES 17-20

The procedure is carried out analogously to Examples 2-5, but instead of 4-methylaniline-2-sulfonic acid there is used an equivalent amount of 2-amino-5-chloro-4-ethylbenzenesulfonic acid:

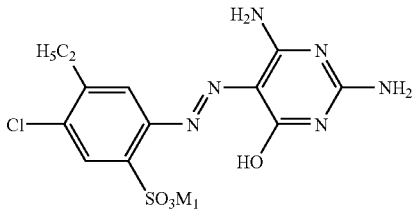

($M_1^+ = H^+$, ½$Ca^{++}$, ½$Sr^{++}$, $NH_4^+$)

The results are very similar to those of Examples 2-5.

EXAMPLES 21-24

The procedure is carried out analogously to Examples 2-5, but instead of 4-methylaniline-2-sulfonic acid there is used an equivalent amount of 2-amino-5-methoxybenzenesulfonic acid:

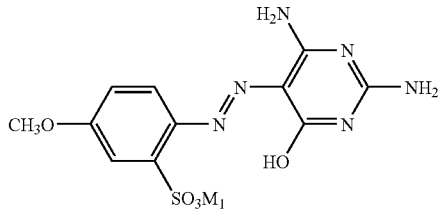

($M_1^+ = H^+$, ½$Ca^{++}$, ½$Sr^{++}$, $NH_4^+$)

The results are very similar to those of Examples 2-5, but with a more red-tinged to orange colour.

EXAMPLES 25-28

The procedure is carried out analogously to Examples 2-5, but instead of 4-methylaniline-2-sulfonic acid there is used an equivalent amount of 5-acetamino-2-aminobenzenesulfonic acid:

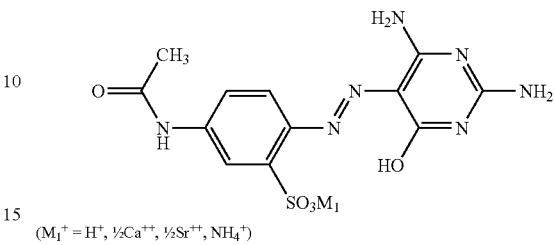

($M_1^+ = H^+$, ½$Ca^{++}$, ½$Sr^{++}$, $NH_4^+$)

The results are similar to those of Examples 2-5, but with a more red-tinged to orange colour.

EXAMPLES 29-32

The procedure is carried out analogously to Examples 2-5, but instead of 4-methylaniline-2-sulfonic acid there is used an equivalent amount of 4-acetamino-2-amino-5-(2'-sulfophenylazo)-benzenesulfonic acid:

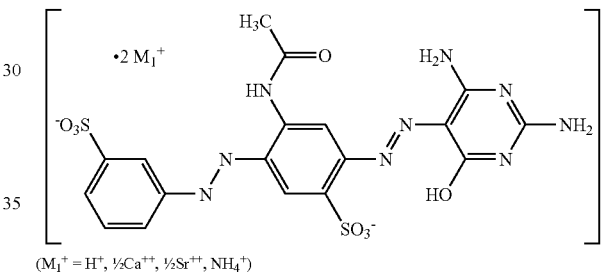

($M_1^+ = H^+$, ½$Ca^{++}$, ½$Sr^{++}$, $NH_4^+$)

The results are similar to those of Examples 2-5, but with a more red-tinged to orange colour.

EXAMPLES 33-36

The procedure is carried out analogously to Examples 2-5, but instead of 2,4-diamino-6-hydroxypyrimidine there is used an equivalent amount of 4-amino-2-dimethylamino-6-hydroxypyrimidine:

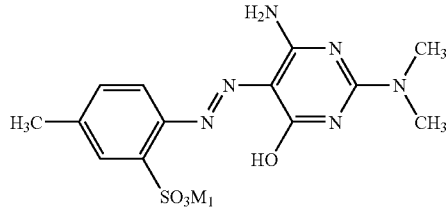

($M_1^+ = H^+$, ½$Ca^{++}$, ½$Sr^{++}$, $NH_4^+$)

The results are similar to those of Examples 2-5, but with a more red-tinged to orange colour.

EXAMPLES 37-66

The pigments obtained in accordance with Examples 7-36 are used for mass-colouring PVC on a calender, yielding homogeneous colorations having good light stability.

EXAMPLES 67-96

The pigments obtained in accordance with Examples 7-36 are used for mass-colouring HDPE in an injection-moulding process, yielding homogeneous colorations having good light stability.

EXAMPLES 97-122

0.2% by weight of the pigments obtained in accordance with Examples 7-32 is incorporated into polyamide 6 in accordance with Example 6, after which test plates (for example 30×50×2 mm) are produced by injection-moulding at 240° C. Homogeneous colorations having good light stability are obtained.

What is claimed is:

1. A process for mass-colouring high molecular weight material, in which process a compound of formula

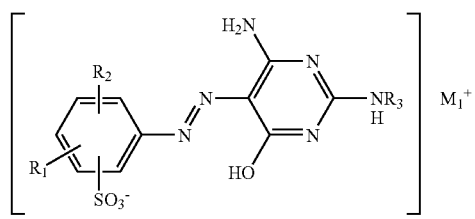

(I)

or a tautomer thereof,
is incorporated into the high molecular weight material before or during shaping
wherein
$M_1$ is H, ½ $M_2$, ⅓ $M_3$ or $NR_4R_5R_6R_7$,
$M_2$ is an alkaline earth or transition metal in oxidation state II or an oxo-metal in oxidation state IV,
$M_3$ is Al (III), a transition metal in oxidation state III or an oxo-metal in oxidation state V,
$R_1$ is H or a non-ionic substituent,
$R_2$ is H or, independently of $R_1$, a further non-ionic substituent,
$R_3$ is H, $C_1$-$C_6$alkyl, CO—$C_1$-$C_6$alkyl or CO-phenyl, and
$R_4$, $R_5$, $R_6$ and $R_7$ are each independently of the others H or phenyl, benzyl or $C_1$-$C_6$alkyl, which are unsubstituted or substituted by hydroxy or by halogen and in the case of $C_3$-$C_6$alkyl is uninterrupted or interrupted by O.

2. A process according to claim 1, wherein $M_2$ is Ca, Co, Cu, Fe, Mg, Mn, Sr, TiO, Zn or ZrO, or $M_3$ is Al, Ce, Co, Cr, Fe or VO.

3. A process according to claim 1, wherein $R_1$ is a non-ionic substituent having a para Hammett constant $\sigma_p$ of from −0.3 to 0.6, and $R_2$ is H or, independently of $R_1$, a further non-ionic substituent having a para Hammett constant $\sigma_p$ of from −0.3 to 0.6.

4. A process according to claim 1, wherein in formula (I) $SO_3M$ is in the position ortho to the azo bridge.

5. A compound of formula

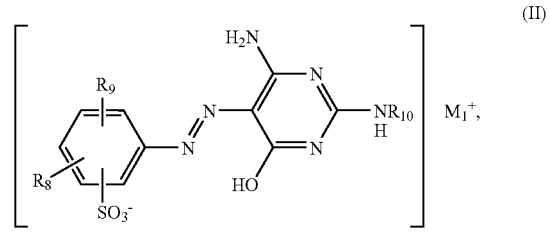

(II)

or a tautomer thereof, wherein
$M_1$ is H, ½ $M_2$, ⅓ $M_3$ or $NR_4R_5R_6R_7$,
$M_2$ is an alkaline earth or transition metal in oxidation state II or an oxo-metal in oxidation state IV,
$M_3$ is Al (III), a transition metal in oxidation state III or an oxo-metal in oxidation state V,
$R_8$ is a non-ionic substituent, different from hydrogen, having a para Hammett constant $\sigma_p$ of from −0.3 to 0.6,
$R_9$ is H or, independently of $R_8$, a further non-ionic substituent having a para Hammett constant $\sigma_p$ of from −0.3 to 0.6,
$R_{10}$ is H, $C_1$-$C_6$alkyl, CO—$C_1$-$C_6$alkyl or CO-phenyl, and
$R_4$, $R_5$, $R_6$ and $R_7$ are each independently of the others H or phenyl, benzyl or $C_1$-$C_6$alkyl, which are unsubstituted or substituted by hydroxy or by halogen and in the case of $C_3$-$C_6$alkyl is uninterrupted or interrupted by O.

6. A compound according to claim 5 of formula

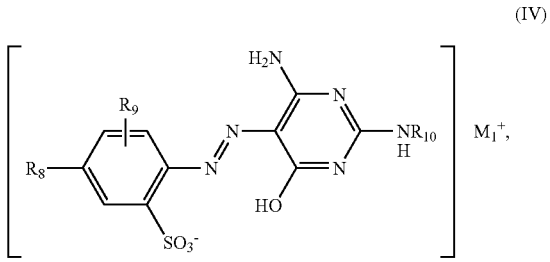

(IV)

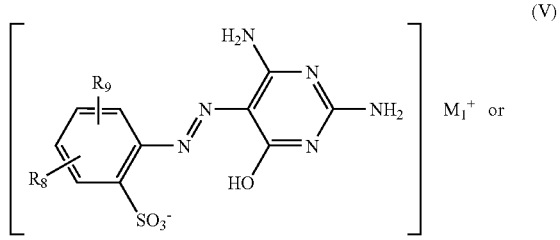

(V)

or

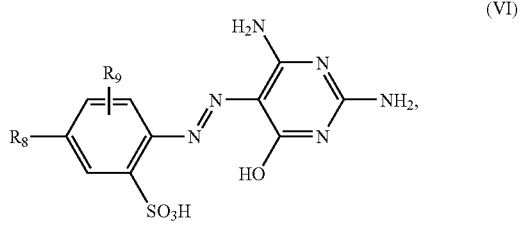

(VI)

or a tautomer thereof.

7. A compound according to claim 6 of formula

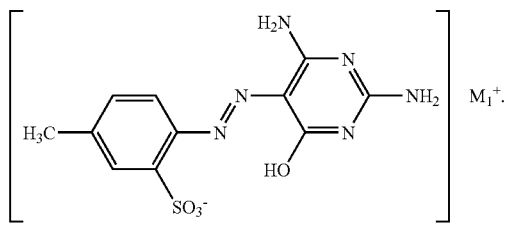
(VII)

8. A compound of formula

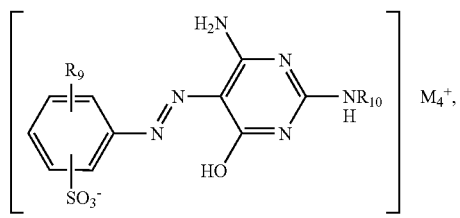
(III)

or a tautomer thereof, wherein
$M_4$ is ½ $M_2$, ⅓ $M_3$ or $NR_4R_5R_6R_7$,
$M_2$ is an alkaline earth or transition metal in oxidation state II or an oxo-metal in oxidation state IV,
$M_3$ is Al (III), a transition metal in oxidation state III or an oxo-metal in oxidation state V,
$R_9$ is H or, independently of $R_8$, a further non-ionic substituent having a para Hammett constant $\sigma_p$ of from −0.3 to 0.6,
$R_{10}$ is H, $C_1$-$C_6$alkyl, CO—$C_1$-$C_6$alkyl or CO-phenyl, and
$R_4$, $R_5$, $R_6$ and $R_7$ are each independently of the others H or phenyl, benzyl or $C_1$-$C_6$alkyl, which are unsubstituted or substituted by hydroxy or by halogen and in the case of $C_3$-$C_6$alkyl is uninterrupted or interrupted by O.

9. A mixture or solid solution comprising a compound according to claim 5 and a compound of formula

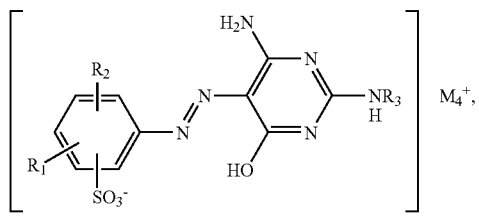

wherein $M_4^+$ is $Na^+$, $Li^+$ or $K^+$,
$R_1$ is H or a non-ionic substituent,
$R_2$ is H or, independently of $R_1$, a further non-ionic substituent, and
$R_3$ is H, $C_1$-$C_6$alkyl, CO—$C_1$-$C_6$alkyl or CO-phenyl.

10. A mass-coloured high molecular weight material comprising from 0.01 to 70% by weight, based on the total coloured high molecular weight material, of a compound of formula (II) according to claim 5, which is present in the form of solid particles distributed in the high molecular weight material or which, in dissolved form, homogeneously penetrates the high molecular weight material.

11. A mass-coloured high molecular weight material according to claim 10 wherein the high molecular weight material is a polyolefin.

12. A mass-coloured high molecular weight material comprising from 0.01 to 70% by weight, based on the total coloured high molecular weight material, of a compound of formula (III) according to claim 8, which is present in the form of solid particles distributed in the high molecular weight material or which, in dissolved form, homogeneously penetrates the high molecular weight material.

13. A mass-coloured high molecular weight material comprising from 0.01 to 70% by weight, based on the total coloured high molecular weight material, of a compound of formula (IV), (V) or (VI) according to claim 6, which is present in the form of solid particles distributed in the high molecular weight material or which, in dissolved form, homogeneously penetrates the high molecular weight material.

14. A mass-coloured high molecular weight material comprising from 0.01 to 70% by weight, based on the total coloured high molecular weight material, of a compound of formula (VII) according to claim 7, which is present in the form of solid particles distributed in the high molecular weight material or which, in dissolved form, homogeneously penetrates the high molecular weight material.

15. A mass-coloured high molecular weight material comprising from 0.01 to 70% by weight, based on the total coloured high molecular weight material, of a mixture or solid solution according to claim 9, which is present in the form of solid particles distributed in the high molecular weight material or which, in dissolved form, homogeneously penetrates the high molecular weight material.

16. A mass-coloured high molecular weight material according to claim 12 wherein the high molecular weight material is a polyolefin.

17. A mass-coloured high molecular weight material according to claim 13 wherein the high molecular weight material is a polyolefin.

18. A mass-coloured high molecular weight material according to claim 15 wherein the high molecular weight material is a polyolefin.

19. A compound of formula (II) according to claim 5, wherein
$M_1$ is H, ½ $M_2$ or $NR_4R_5R_6R_7$,
$R_8$ is a non-ionic substituent, different from hydrogen, having a para Hammett constant $\sigma_p$ of from −0.3 to 0.3,
$R_9$ is H or, independently of $R_8$, a further non-ionic substituent having a para Hammett constant $\sigma_p$ of from −0.3 to 0.3,
and $R_{10}$ is H or CO—$C_1$-$C_6$alkyl.

20. A compound of formula (III) according to claim 8, wherein $R_9$ is H or non-ionic substituent having a para Hammett constant $\sigma_p$ of from −0.3 to 0.3, and $R_{10}$ is H or CO—$C_1$-$C_6$alkyl.

* * * * *